(12) United States Patent
Lussier (10) Patent No.: US 10,138,386 B2
(45) Date of Patent: Nov. 27, 2018

(54) METHOD OF INKJET PRINTING A COLORLESS INK

(71) Applicant: Eastman Kodak Company, Rochester, NY (US)

(72) Inventor: Barbara Boland Lussier, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 38 days.

(21) Appl. No.: 15/240,176

(22) Filed: Aug. 18, 2016

(65) Prior Publication Data

US 2018/0051182 A1    Feb. 22, 2018

(51) Int. Cl.
| | | |
|---|---|---|
| C09D 11/033 | (2014.01) |
| C09D 11/40 | (2014.01) |
| C09D 11/38 | (2014.01) |
| C09D 11/322 | (2014.01) |
| C09D 11/107 | (2014.01) |
| B41J 2/21 | (2006.01) |
| B41M 7/00 | (2006.01) |
| C09D 11/102 | (2014.01) |
| C09D 11/30 | (2014.01) |

(52) U.S. Cl.
CPC ........... *C09D 11/033* (2013.01); *B41J 2/2114* (2013.01); *B41M 7/0036* (2013.01); *C09D 11/102* (2013.01); *C09D 11/107* (2013.01); *C09D 11/30* (2013.01); *C09D 11/322* (2013.01); *C09D 11/38* (2013.01); *C09D 11/40* (2013.01)

(58) Field of Classification Search
CPC ... C09D 11/083; C09D 11/102; C09D 11/107; C09D 11/30; C09D 11/322; C09D 11/38; C09D 11/40; B41J 2/2114; B41M 7/0036
USPC ........................................................ 347/20
See application file for complete search history.

(56) References Cited

U.S. PATENT DOCUMENTS

| | | | |
|---|---|---|---|
| 5,764,263 A | 6/1998 | Lin | |
| 6,000,793 A | 12/1999 | Inamoto | |
| 6,464,348 B1 | 10/2002 | Kasperchik et al. | |
| 6,543,888 B2 | 4/2003 | Nishita | |
| 6,604,819 B2 | 8/2003 | Nishita | |
| 6,723,784 B2 | 4/2004 | Ito et al. | |
| 6,794,425 B1 | 9/2004 | Ellis et al. | |
| 6,863,392 B2 | 3/2005 | Shimomura et al. | |
| 6,877,850 B2 | 4/2005 | Ishimoto et al. | |
| 7,015,259 B2 | 3/2006 | Kataoka et al. | |
| 7,060,740 B2 | 6/2006 | Kataoka et al. | |
| 7,261,405 B2 | 8/2007 | Ohya et al. | |
| 7,273,276 B2 | 9/2007 | Kida et al. | |
| 7,304,099 B2 | 12/2007 | Gore | |
| 7,404,849 B2 | 7/2008 | Jackson et al. | |
| 7,411,011 B2 | 8/2008 | Vincent et al. | |
| 7,537,650 B2 | 5/2009 | Szajewski et al. | |
| 7,772,298 B2 | 8/2010 | Kataoka et al. | |
| 7,922,800 B2 | 4/2011 | Bauer et al. | |
| 7,997,714 B2 | 8/2011 | Ma et al. | |
| 8,187,371 B2 | 5/2012 | Brust et al. | |
| 8,192,008 B2 | 6/2012 | Brust et al. | |
| 8,240,835 B2 | 8/2012 | Iwao | |
| 8,349,211 B2 | 1/2013 | Cai | |
| 8,455,570 B2 | 6/2013 | Lindstrom et al. | |
| 8,641,180 B2 | 2/2014 | Komatsu | |
| 8,814,340 B2 | 8/2014 | Goto | |
| 8,955,955 B2 | 2/2015 | Mimura et al. | |
| 9,033,486 B2 | 5/2015 | Symkens et al. | |
| 2003/0166742 A1 | 9/2003 | Hirasa et al. | |
| 2004/0011248 A1 | 1/2004 | Taguchi et al. | |
| 2005/0166794 A1 | 8/2005 | Bauer | |
| 2006/0100306 A1 | 5/2006 | Yau et al. | |
| 2006/0100308 A1 | 5/2006 | Yau et al. | |
| 2006/0205840 A1 | 9/2006 | Kato et al. | |
| 2006/0223908 A1* | 10/2006 | Szajewski | C09D 11/40 523/160 |
| 2007/0052785 A1 | 3/2007 | Itoh et al. | |
| 2008/0207811 A1 | 8/2008 | Brust et al. | |
| 2009/0169748 A1 | 7/2009 | House et al. | |
| 2009/0169749 A1 | 7/2009 | Brust et al. | |
| 2009/0221736 A1 | 9/2009 | McCurry | |
| 2009/0262159 A1* | 10/2009 | Lang | B41J 2/0057 347/15 |
| 2009/0304927 A1 | 12/2009 | Kamibayashi et al. | |
| 2011/0076404 A1* | 3/2011 | Brust | C09D 11/322 427/256 |
| 2011/0122180 A1 | 5/2011 | Cook et al. | |
| 2012/0050380 A1* | 3/2012 | Falkner | C09D 11/102 347/20 |
| 2012/0120142 A1 | 5/2012 | Tom et al. | |
| 2012/0236068 A1 | 9/2012 | Matsushita | |

(Continued)

*Primary Examiner* — Stephen Meier
*Assistant Examiner* — Alexander D Shenderov
(74) *Attorney, Agent, or Firm* — J. Lanny Tucker (57) ABSTRACT

Colorless coatings can be ink jetted onto part or all of colored images as spaced colorless drops to provide a colorless image over at least 50% of colored areas of the colored image and on a predetermined areal percentage of non-colored areas of the colored image. The aqueous colorless inkjet ink composition has a viscosity of less than 0.005 N-sec at 25° C., and comprises an anionic polyether polyurethane and an anionic acrylic or styrene-acrylic polymer, each having an acid number of at least 50, and such polymeric materials are present in unique amounts. Use of the aqueous colorless inkjet ink composition can be adjusted to provide increased gloss on the colored image in either or both of the colored area or non-colored areas.

16 Claims, 3 Drawing Sheets

(56) References Cited

U.S. PATENT DOCUMENTS

| | | |
|---|---|---|
| 2013/0222496 A1 | 8/2013 | Iu |
| 2013/0286086 A1 | 10/2013 | Kato et al. |
| 2014/0231674 A1 | 8/2014 | Cook |
| 2015/0000559 A1 | 1/2015 | Mohapatra et al. |
| 2015/0126638 A1 | 5/2015 | Abergel et al. |
| 2015/0152281 A1 | 6/2015 | Iu et al. |
| 2015/0191031 A1 | 7/2015 | Ohta et al. |
| 2015/0273871 A1* | 10/2015 | Ohta .................... B41J 11/002 428/203 |

* cited by examiner

METHOD OF INKJET PRINTING A COLORLESS INK

RELATED APPLICATION

Reference is made to copending and commonly assigned U.S. Ser. No. 15/240,213 (filed on Aug. 18, 2016, by Lussier and Linehan) the disclosure of which is incorporated herein by reference.

FIELD OF THE INVENTION

This invention relates to a method for providing a colorless coating over at least part of a colored image on a substrate using inkjet printing such as continuous inkjet printing. The method can be used to provide a controlled glossy coating having improved durability.

BACKGROUND OF THE INVENTION

Inkjet printing systems are generally of two types: drop-on-demand (DOD) printing systems and continuous inkjet (CIJ) printing systems. Inkjet printing is a standard method for printing a colored image onto a substrate wherein a stream of ink droplets is directed from a printing device to a surface of a suitable receiver element or substrate. The direction of the stream of droplets is controlled electronically causing the droplets to print the desired image or information on the substrate surface without requiring contract between the printing device and the surface to which the ink is applied. Objects comprising substrates to which inkjet printing is well suited include but are not limited to, containers for consumer products, currency, draft checks, envelopes, letterhead, identification cards, lottery tickets, bank cards, identification strips, labels, brochures, signage, and other well-known materials.

Drop-on-demand printing systems are widely used in home or consumer inkjet printers and slower consumer printers, both of which have been available for several decades. As the name implies, this type of inkjet printing uses a print head that ejects drops of ink only when signaled to do so by a digital controller.

CIJ printing systems generally comprise two main components, a fluid system (including an ink reservoir) and one or more print heads. Ink can be pumped through a supply line from the ink reservoir to a manifold that distributes the ink to a plurality of orifices, typically arranged in linear array(s), under sufficient pressure to cause ink streams to issue from the orifices of the print head(s). Stimulations can be applied to the print head(s) to cause those ink streams to form streams of uniformly sized and spaced drops that are deflected in a suitable manner, into printing or non-printing paths. Non-printing drops can be returned to the ink reservoir using a drop catcher and a return line. Thus, in contrast to DOD printing systems, CIJ printing systems involves use of a continuous stream of ink drops that are separated to discriminate between spaced printing drops and non-printing drops. This discrimination can be accomplished by electrostatically charging the drops and passing the charged drops through an electric field. Charged drops are deflected by a charge field and can be caught and returned to the reservoir of ink. Uncharged drops are printed on a substrate or receiver material. This discrimination can also be accomplished when the printhead digitally creates large and small drops. Small drops are deflected by an air current and returned to the reservoir of ink. Large drops, being less affected by the air current, are printed onto a substrate or receiver material. Some useful CIJ printing apparatus and printhead fabrication are described for example in U.S. Pat. No. 6,588,888 (Jeanmaire et al.) and U.S. Pat. No. 6,943,037 (Anagnostopoulos et al.).

Commercially available CIJ inks are mostly aqueous dye-based inks that exhibit a number of problems. In such dye-based inks, no particles are observable under the microscope. Although there have been many recent advances in the art of dye-based inkjet inks, such inks still suffer from deficiencies such as low optical densities on coated glossy paper and poor light-fastness. When water is used as the carrier, such inks also generally suffer from poor water fastness, poor smear resistance, and uncontrolled gloss.

To address many of these problems, pigment based inks have been developed and incorporated into commercial CIJ systems as noted in the patents cited above and various publications cited therein. In addition, U.S. Pat. No. 7,537,650 (Szajewski et al.) describes inkjet sets containing a colored aqueous ink (with cationic coloring agent or pigment) and a substantially colorless aqueous ink that contains an anionic polymer or oligomer. Such inks can be applied in substantially an overlaying manner. Both inks are generally applied to the same areas of a receiver element so that the mixing of cationic and anionic materials in the inks provide a more consistent single color density on a variety of substrates, thereby reducing intercolor bleed and non-uniformities.

In general, such pigment-based colored inks can comprise a wide variety of colored pigments that can be chosen depending upon the specific application and performance requirements for the printing system and desired printing results. For example, such pigments can include but are not limited to, carbon black or other black pigments, red pigments, green pigments, blue pigments, orange pigments, violet pigments, magenta pigments, yellow pigments, and cyan pigments. The printed images using such pigment-based inks are generally desired to have a visual density of at least 0.5.

Colorless or invisible aqueous inkjet printer ink compositions containing various fluorescing pigments, and optionally colored non-fluorescing pigments, are described for example in U.S. Pat. No. 8,349,211 (Cai et al.) and in U.S. Patent Application Publication 2014/0231674 (Cook).

A pigment is generally desirable in inkjet ink compositions to provide resistance to fading. However, pigments generally must be physically milled to produce particles of desired small size to provide sufficient colloidal stability to the particles, with or without a suitable dispersant.

Pigmented inkjet ink compositions may have limited durability after printing on receiver elements ("substrates"), especially under conditions where abrasive forces are applied to the printed images. Furthermore, the printed images on the receiver elements are susceptible to defects from immediately after printing to several minutes while the inkjet printer ink compositions are drying. The durability of the dried printed images is also subject to environmental factors such as temperature and humidity that, under certain circumstances, can degrade image durability.

To solve these various problems, pigmented aqueous inkjet ink compositions have been formulated with various polymers, dispersants, and other addenda to provide more durable images under printing physical abuse and environmental conditions. Such inkjet ink compositions are described in U.S. Patent Application Publication 2008/0207811 (Brust et al.) and U.S. Pat. No. 8,192,008 (Brust et al.). Polyurethanes and polyureas are described as additives in inkjet ink compositions in U.S. Patent Application Publications 2009/0169748 (House et al.), 2009/0169749 (Brust et al.), and 2012/0050380 (Falkner et al).

Although the noted aqueous inkjet ink compositions provide improvements in the durability of inkjet printed images, when the polyurethane has too high an acid number, the web rub durability of the resulting printed image is decreased.

Inkjet ink sets are described in U.S. Patent Application Publication 2008/0207811 (Brust et al.), which sets include pigment-based color inks and pigment-free colorless inks, and the individual inks contain an acidic polyurethane binder to improve high temperature stability. Similar pigment-based colorless inks are also described in U.S. Pat. No. 8,187,371 (Brust et al.), which inks contain a polycarbonate-type polyurethane and an acrylic polymer.

DOD colorless inkjet compositions and systems are described in WO 2014/021840 (Iu et al.) that also describes the application of the colorless composition to provide print quality, gloss, scratch resistance, and rub resistance. Such aqueous-based inks comprise various solvents and additives such as essential wax particles and polymeric binders to provide durability. The wax particles are present in an amount of from 0.3% and up to and including 6% of the total inkjet ink composition weight.

While the use of wax particles may improve durability of inkjet printed images from DOD imaging apparatus, the presence of wax particles creates problems for many CIJ imaging systems and apparatus in that dispersions of such particles can become unstable and aggregate under the high shear conditions of continuous ink jetting and recirculation. The larger aggregated wax particles interfere with the drop formation process, eventually leading to plugged filters, plugged nozzles and crooked or missing jets. So, there is a need to avoid the use of wax particles without sacrificing printed image durability.

While the art has described useful colorless pigment-based ink compositions, particularly for DOD printing applications, there continues to be need for improved aqueous colorless inkjet ink compositions that provide enhanced gloss and durability when ink jetted onto at least part of a color image that has for example been formed by a pigment-based colored inkjet composition. Moreover, there is a need to be able to control the glossiness and durability for different types of colored inkjet ink printed images for example, by adjusting the chemical composition of the aqueous colorless inkjet ink compositions.

SUMMARY OF THE INVENTION

The present invention provides a method of inkjet printing, comprising:
providing a substrate having a predetermined area for imaging,
providing a colored image on the substrate, the colored image comprising colored areas and non-colored areas on the substrate, and
ink jetting an aqueous colorless inkjet ink composition as printing colorless drops to provide a colorless image over at least 50% of the colored areas of the colored image and over a predetermined areal percentage of the non-colored areas of the colored image,
wherein the aqueous colorless inkjet ink composition is visible colorant-free and non-UV curable, has a viscosity of less than 5 centipoises (0.005 N-sec) at 25° C., and comprises an anionic polyether polyurethane having an acid number of at least 50 and an anionic acrylic polymer or anionic styrene-acrylic polymer having an acid number of at least 50; the weight ratio of the anionic polyether polyurethane to the anionic acrylic polymer or anionic styrene-acrylic polymer is from 1:9 to and including 9:1; and the total amount of the anionic polyether polyurethane and the anionic acrylic polymer or anionic styrene-acrylic polymer is less than or equal to 20 weight % based on the total aqueous colorless inkjet ink composition weight.

In addition, the present invention provides an ink set comprising at least the following individual inks:
1) an aqueous colorless inkjet ink composition that is visible colorant-free and non-UV curable, has a viscosity of less than 5 centipoises (0.005 N-sec) at 25° C., and comprises an anionic polyether polyurethane having an acid number of at least 50 and an anionic acrylic polymer or styrene-acrylic polymer having an acid number of at least 50;
wherein the weight ratio of the anionic polyether polyurethane to the anionic acrylic polymer or anionic styrene-acrylic polymer is from 1:9 to and including 9:1; and the total amount of the anionic polyether polyurethane and the anionic acrylic polymer or anionic styrene-acrylic polymer is less than or equal to 20 weight % based on the total aqueous colorless inkjet ink composition weight; and
2) an aqueous color inkjet ink composition that comprises at least one visible colorant.

The present invention provides a number of advantages. The aqueous colorless inkjet ink compositions used in the present invention can be digitally and selectively applied (ink jetted) overlying (or superimposed on) various color images to provide increased image durability. This improved result can be achieved without the use of wax particles that are commonly used in the prior art ink compositions.

In addition, by varying the aqueous colorless inkjet ink chemical composition within the invention parameters, the glossiness of the resulting ink jetted image can be controlled and adjusted as needed. For example, the glossiness of either colored areas or non-colored areas of a colored image can be increased by at least 3 gloss units, or even at least 5 gloss units, as measured using a 75° glossmeter, as described in more detail below.

The aqueous colorless inkjet ink compositions described herein can be used in various ink jetting methods and equipment, and especially in continuous ink jetting methods and equipment that enable recirculation of unused (non-printing) inkjet ink drops that are collected during the printing operation.

DETAILED DESCRIPTION OF THE INVENTION

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure has broader application than is explicitly described for any specific embodiment.

Definitions

As used herein to define various components of the aqueous colorless inkjet ink compositions and aqueous color inkjet ink compositions, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered to be approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

Unless otherwise indicated, the terms "aqueous colorless inkjet ink composition" and "colorless ink composition" are meant to refer to embodiments useful in the present invention.

As used herein, the parameter "acid number" (also known as acid value) is defined as the milligrams (mg) of potassium hydroxide required to neutralize 1 g of the described acidic polymer.

The aqueous colorless inkjet ink compositions used the present invention can exhibit a "static surface tension" as measured using the standard Wilhelmy Plate method of less than 38 dynes/cm, or at least 30 dynes/cm and up to and including 36 dynes/cm. In many embodiments, the aqueous colorless inkjet ink composition can exhibit a static tension that is less than the surface energy of the colored areas of the colored image created in the practice of the present invention. The surface energy of these colored areas can be extrapolated from that of the aqueous color inkjet ink compositions used to provide the colored areas.

The Wilhelmy Plate method is described for example, at http://www.kruss.de/services/education-theory/glossary/wilhelmy-plate-method/Butt, Hans-Jürgen; Graf, Karlheinz; Kappl, Michael (2006) and Physics and Chemistry of Interfaces (2nd rev); Weinheim: Wiley-VCH-Verl. p. 16.

The term "aqueous" in aqueous colorless inkjet ink compositions as used in the present invention means that the water content is greater than 50 weight % based on the total dispersion or composition weight. Thus, water is the predominant solvent.

Aqueous Colorless Inkjet Ink Compositions

The various embodiments of the aqueous colorless inkjet ink compositions used in the present invention exhibit a number of common features but each embodiment need not have the exact same combination of features:

1) They are substantially free of visible colorants (both dyes and pigments) that are described in more detail below. By the term "substantially free" is meant that visible colorants are present in an amount such that the optical density of the aqueous colorless inkjet ink composition is less than 0.1, or even less than 0.05, as measured using a standard spectrophotometer.

2) They are non-UV radiation curable meaning that they contain substantially no components that can be cured or crosslinked in response to UV irradiation. By the term "substantially no", it is meant that such UV-curable components are present in an amount of less than 0.5 weight % based on the total weight of the aqueous colorless inkjet ink composition.

3) They have a viscosity of less than 5 centipoises (0.005 N-sec), or less than or equal to 3 centipoises (0.003 N-sec) at 25° C., or more likely less than or equal to 2 centipoises (0.002 N-sec) or even less than or equal to 1.5 centipoise (0.0015 N-sec), all measured at 25° C. using a standard viscometer.

4) They comprise one or more anionic polyether polyurethanes, each anionic polyether polyurethane having an acid number of at least 50, or of at least 60 and up to and including 150, or even at least 55 and up to and including 90, which polymeric materials are described in more detail below.

5) They comprise one or more anionic acrylic polymers or anionic styrene-acrylic polymers, each anionic acrylic polymer or anionic styrene-acrylic polymer having an acid number of at least 50, or of at least 120 and up to and including 240, or even at least 160 and up to and including 220, which polymeric materials are described in more detail below.

6) They have a weight ratio of the total weight of the one or more anionic polyether polyurethanes to the total weight of the one or more anionic acrylic polymer or anionic styrene-acrylic polymers is from 1:9 and to and including 9:1, or more likely of from 1:3 and to and including 3:1. If there is too little of the anionic polyether polyurethanes, the aqueous colorless inkjet ink composition can exhibit poor wet durability of the ink jetted colorless image as well as plugging of filters and other equipment during extended recirculation of the composition. If there is too little of the anionic acrylic polymer or anionic styrene-acrylic polymers, the aqueous colorless inkjet ink composition can exhibit poor image gloss, dry rub durability of the inkjet printed images, as well as the noted plugging problems during extended recirculation.

7) The have a total cumulative amount (weight) of the one or more anionic polyether polyurethanes and the one or more anionic acrylic polymer or anionic styrene-acrylic polymers is less than or equal to 20 weight %, or at least 5 weight % and up to and including 18 weight %, or at least 7 weight % and up to and including 12 weight %, all amounts being based on the total aqueous colorless inkjet ink composition weight.

8) They are substantially free of waxes (including wax particles) such as those described in WO 2014/021840 (noted above). The term "substantially free" means that waxes and wax particles are present in an amount of less than 0.20 weight % or even less than 0.15 weight %, based on the total weight of the aqueous colorless inkjet ink composition.

Anionic polyether polyurethanes that are useful in the present invention are condensation polymers prepared using suitable compounds ("monomers") having at least two hydroxyl groups (for example, diols or triols) and compounds ("monomers") having at least two isocyanates groups (such as diisocyanates and triisocyanates), which condensation polymers have suitable acidic groups to provide the desired acid number of the resulting polymer. The acidic groups are desirably carboxylic acid groups but any type of acidic group can be used if desired. Suitable compounds having sufficient hydroxyl groups and compounds having sufficient isocyanate groups are well known in the art, and any of these compounds can be substituted with one or more suitable acidic groups such as carboxylic acid groups. Not all of such compounds, however, need be substituted with the anionic groups. Such anionic polyether polyurethanes are therefore generally dispersible within the aqueous colorless inkjet ink compositions without the need for separate dispersing agents ("dispersants").

The useful anionic polyether polyurethanes can also comprise recurring units derived from monomers that do not contain acidic groups but can have multiple hydroxyl groups are often known as polyol or polyhydroxyl derivatives of polyethers, as described in U.S. Pat. No. 8,430,492 (Falkner et al.), the disclosure of which is incorporated herein by reference.

Particularly useful anionic polyether polyurethanes contain a polyether diol unit and generally have a molecular weight ($M_w$) of at least 10,000 Daltons and up to and including 30,000 Daltons or at least 15,000 Daltons and up to and including 25,000 Daltons, as measured for example by gel permeation chromatography (GPC).

Particularly useful polyether polyurethanes can be individually represented by the following Structure (I):

wherein $R_1$ is the central portion of recurring units derived from a polyisocyanate, $R_2$ represents a recurring unit derived from a polyether and having a molecular weight of at least 250 Daltons and up to and including 2900 Daltons, $R_3$ represents a central portion of a recurring unit containing an acidic group, and X and Y can be the same or different and are oxygen or nitrogen as long as at least one of X and Y is oxygen.

For example, $R_1$ can be a divalent, substituted or unsubstituted hydrocarbon group including divalent hydrocarbon groups comprising 1 to 20 carbon atoms in the chain and one or more unsubstituted or substituted alicyclic, aliphatic, or aromatic groups, for example, as substituted or unsubstituted 1,4-arylene-methylene-1,4-arylene, substituted or unsubstituted 1,4-cyclohexylene-methylene-1,4-cyclohexylene, substituted or unsubstituted n-hexylene, and substituted or unsubstituted 5-methyl-4,4-dimethyl-2,5-hexylene-methylene.

In Structure (I), $R_2$ can be a prepolymer comprising ethylene oxide, propylene oxide, tetramethylene oxide, or a mixture thereof that can be introduced into the polyurethane using any suitable polyol. For example, the polyether segment can be introduced into the polyurethane backbone by using a prepolymer with both ends terminated with a hydroxyl (diol) or an amino (diamine) group. Such prepolymers are known as polyols and polyamines. Useful polyether diols and diamines are sold under the tradenames TERATHANE® (Dupont) and JEFFAMINE®, for example the D, ED, and M series compounds (Huntsman). Another useful polyether diamine is a polytetrahydrofuran bis(3-aminopropyl) terminated having a molecular weight of about 1,000 Daltons. Mixtures of these various reactants can be used if desired.

In Structure (I), $R_3$ can be obtained from polyols comprising phospho, carboxy, or sulfo groups, or a mixture of such groups. Polyols comprising carboxy groups include but are not limited to, 2,2'-bis(hydroxy-methyl)propionic acid, 2,2'-bis(hydroxymethyl)butanoic acid, and hydroxyether of 2,4'-bis(l-hydroxyphenyl)valeric acid. Mixtures of these polyols can be used if desired.

Useful water-soluble or water-dispersible anionic polyether polyurethanes can be prepared by preparing prepolymers having a relatively low molecular weight and small excess of isocyanate groups and chain-extending with a chain extender the prepolymers into high molecular weight polyurethane during the dispersion process as described for example in [0045]-[0049] of U.S. Patent Application Publication 2008/0207811 (noted above) the disclosure of which is incorporated herein by reference.

The acidic groups in the anionic polyether polyurethanes useful in this invention can be at least partially and up to 100% neutralized (converted into salts) using monovalent inorganic bases such as alkaline metal hydroxides or organic amines such as dimethylethanolamine.

Anionic acrylic polymers and anionic styrene-acrylic polymers that are useful in the present invention are generally water-soluble or water-dispersible due to the presence of anionic groups distributed throughout the polymeric backbone. Such water-solubilizing anionic groups can include sulfonic acid groups and carboxylic acid groups. For these polymers, the term "water-soluble" is meant herein that when the anionic acrylic polymer or anionic styrene-acrylic polymer is dissolved in water and when such polymer is at least partially neutralized with an inorganic monovalent base or an organic amine base, the resultant solution is visually clear.

Ethylenically unsaturated polymerizable monomers ("monomers") useful for making useful anionic acrylic polymers include but are not limited to, methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, 2-hydroxypropyl methacrylate, acrylonitrile, methacrylonitrile, vinyl acetate, vinyl propionate, vinylidene chloride, vinyl chloride, butadiene, isoprene, N,N-dimethyl acrylamide, acrylic acid, methacrylic acid, chloromethacrylic acid, maleic acid, and derivatives thereof. Other useful ethylenically unsaturated polymerizable monomers include other compounds that are described in [0055] of U.S. Patent Application Publication 2008/0207811 (noted above). The anionic acrylic polymers can comprise recurring units derived from the one or more of the noted monomers that are arranged in blocks or in random fashion along the polymer backbone.

The anionic styrene-acrylic polymers can be derived from at least one or more acrylic monomers (as described above) and at least one or more styrene monomers (including styrene and derivatives thereof) in blocks or the same recurring units or randomly occurring recurring units.

The anionic acrylic polymers and anionic styrene-acrylic polymers can have a weight average molecular weight ($M_w$) of at least 1,000 Daltons up to and including 100,000 Daltons or typically of at least 1,000 Daltons and up to and including 50,000 Daltons as measured for example using gel permeation chromatography. In some embodiments, the molecular weight can be at least 1500 Daltons and up to and including 20,000 Daltons. In some other embodiments, combinations of anionic acrylic polymers and anionic styrene-acrylic polymers can be used in which at least one anionic acrylic polymer or anionic styrene-acrylic polymer has a molecular weight of at least 2,000 Daltons and up to and including 10,000 Daltons and at least one other anionic acrylic polymer or anionic styrene-acrylic polymer in the combination has a molecular weight greater than 10,000 Daltons.

The anionic acrylic polymers and anionic styrene-acrylic polymers can be prepared using emulsion polymerization, solution polymerization, or bulk polymerization techniques that are well known in the art. In addition, the acidic groups in such polymers can be at least partially neutralized in a manner like neutralization of the anionic polyether polyurethanes described above.

Representative anionic acrylic polymers and anionic styrene-acrylic polymers useful in the present invention are described for example in [0061] of U.S. Patent Application Publication 2008/207811 (noted above). Examples of useful anionic styrene-acrylic polymers include those commercially available under the trademarks JONCRYL® (S.C. Johnson Co.), TRUDOT® (Mead Westvaco Co.), and VANCRYL® (Air Products and Chemicals, Co.).

The aqueous colorless inkjet ink composition used in the present invention can comprise one or more humectants that are generally water soluble or water miscible organic solvents and have a viscosity that is greater than 40 centipoises or even at least 100 centipoises when measured at 25° C. using a conventional viscometer. For example, any water-soluble humectant known in the inkjet art that is compatible with the other requirements of the invention can be used. By water-soluble is meant that a mixture of the employed humectant(s) and water is homogeneous and visually clear. While an individual humectant can be employed, mixtures of two or more humectants, each of which imparts a useful property, can be used. Representative examples of humectants useful in the aqueous colorless inkjet ink compositions include but are not limited to the following compounds:

(1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol;

(2) polyhydric alcohols (polyols), such as ethylene glycol, diethylene glycol, triethylene glycol, tetraethylene glycol, propylene glycol, dipropyleneglycol, each polyethylene glycol and polypropylene glycol independently having an average molecular weight of at least 200 and up to and including 5000 Daltons, 1,2-propanediol, 1,3-propanediol, 1,2-butanediol, 1,3-butanediol, 1,4-butanediol, 1,2,4-butanetriol, 3-methyl-1,3-butanediol, 2-methyl-1,3-propanediol, 1,5-pentanediol, 1,6-hexanediol, 2-methyl-2,4-pentanediol, 1,7-heptanediol, 2-ethyl-1,3-hexane diol, 2,2,4-trimethyl-1,3-pentane diol, 1,8-octane diol, glycerol, 1,2,6-hexanetriol, 2-ethyl-2-hydroxymethyl-propanediol, 2-methyl-2-hydroxymethyl-propanediol, saccharides, sugar alcohols, and thioglycol;

(3) polyoxygenated polyols and their derivatives such as glycerol, diglycerol, polyglycerols, glycerol ethoxides, glycerol propoxides, glyceryths, alkylated and acetylated glyceryths, pentaerythritol, pentaerythritol ethoxides, and pentaerythritol propoxides and their alkylated and acetylated derivatives;

(4) nitrogen-containing compounds such as urea, 2-pyrrolidone, N-methyl-2-pyrrolidone, imidazolidinone, N-hydroxyethyl acetamide, N-hydroxyethyl-2-pyrrolidinone, 1-(hydroxyethyl)-1,3-imidazolidinone, 1,3-dimethyl-2-imidazolidinone, and 1,3-dihydroxy-2-imidazolidinone;

(5) sulfur-containing compounds such as 2,2'-thiodiethanol, dimethyl sulfoxide, and tetramethylene sulfone; and (6) water soluble N-oxides such as 4-methylmorpholine-N-oxides.

Useful humectants generally have melting points below the typical operating temperature of the intended printer system to avoid the formation of crystalline deposits on the print head or in the maintenance system. Practically, this means that the useful humectants have melting points below 30° C. or even below 20° C.

The one or more humectants can be present in an amount of at least 0.25 weight %, or of at least 0.5 weight % and up to and including 10 weight %, or of at least 0.5 weight % and up to and including 8 weight %, all based on the total weight of the aqueous colorless inkjet ink composition.

The aqueous colorless inkjet ink compositions used in this invention can also include one or more water-miscible co-solvents such as alcohols, lower mono- and di-alkyl ethers derived from polyhydric alcohols, nitrogen-containing compounds such as urea, 2-pyrrolidinone, and 1,3-dimethyl-2-imidazolidinone, and sulfur-containing compounds such as 2,2'-thiodiethanol, dimethyl sulfoxide, and tetramethylene sulfone. The total amounts of such compounds can be at least 0.5 weight % and up to and including 8 weight %, based on the total weight of the aqueous colorless inkjet ink composition.

In addition, the aqueous colorless inkjet ink composition can further comprise at least 0.1 weight % and up to and including 2 weight % of colloidal non-colored inorganic particles including but are not limited to, alumina, boehmite clay, calcium carbonate, titanium dioxide, calcined clay, aluminosilicates, silica, or barium sulfate, as long as the optical density of the aqueous colorless inkjet ink composition is less than 0.1 as described above.

The aqueous colorless inkjet ink composition used in this invention can also include one or more film-forming polymers having molecular weight of at least 10,000 Daltons and different from the anionic polyether polyurethanes, anionic acrylic polymers, and anionic styrene-acrylic polymers described above. Such film forming polymers can be derived from various ethylenically unsaturated polymerization monomers and can be present in an amount of up to and including 10 weight %.

In addition, modified polysiloxanes can be present in the aqueous colorless inkjet ink compositions. Examples of such materials are ethoxylated or propoxylated silicone-based "surfactants" that can be obtained commercially under the trademarks SILWET® (CL Witco), and BYK® (Byk Chemie) such as BYK® 333, 346, 348, 349, and 3455, as well as Dow Corning DC67, DC57, DC28, DC500W, and DC51. Non-silicone surfactants can also be used, including but not limited to anionic, cationic, nonionic, or amphoteric surfactants such as those described in [0065]-[0066] of U.S. Patent Application Publication 2008/0207811 (noted above) or commercially available as SURFYNOL® surfactants (Air Products) including SURFYNOL® 440 and 465 alkynediol surfactants or polymeric surfactants such as commercially available as BYK® 381 and BYK® DYNEWET® 800. One or more modified polysiloxanes or non-silicone surfactants can be present in a cumulative amount of up to and including 2 weight %, or up to and including 1 weight %, based on the total weight of the aqueous colorless inkjet ink composition.

Colorless fluorescent colorants can also be present in the aqueous colorless inkjet ink compositions and examples of such compounds are described in U.S. Patent Application Publication 2014/0231674 (noted above), the disclosure of which is incorporated herein by reference.

Other additives that can be present in the aqueous colorless inkjet ink compositions, in amounts that would be readily apparent to one skilled in the art, include but are not limited to thickeners, conductivity-enhancing agents, drying agents, waterfast agents, viscosity modifiers, pH buffers, wetting agents, corrosion inhibitors, biocides (such as Kordek and Proxel materials), fungicides, antifoamants, defoamers, UV radiation absorbers, antioxidants, and light stabilizers available under the trademarks TINUVIN® (Ciba) and IRGANOX® (Ciba), as well as other additives described in Col. 17 (lines 11-36) of U.S. Pat. No. 8,455,570 (Lindstrom et al.) the disclosure of which is incorporated herein by reference.

In some embodiments, the aqueous colorless inkjet ink compositions used in the present invention comprises one or more defoamers (antifoamants), at least one of which has a hydrophilic-lipophilic balance (HLB) value of at least 3 and up to and including 5, or even at least 3 and up to and including 4. Such HLB value defoamers are generally present in an amount of at least 0.15 weight % and up to and including 1 weight %, or in an amount of at least 0.2 weight % and up to and including 0.8 weight %, all based on the total aqueous colorless inkjet ink composition weight. Suitable materials useful in this manner would be readily apparent to one skilled in the art in view of the teaching in copending and commonly assigned U.S Ser. No. 15/240,213, noted above.

Water is generally present in the aqueous colorless inkjet ink compositions described herein in an amount of at least 75 weight % or of at least 80 weight %, but generally no more than 90 weight %, based on the total weight of the aqueous colorless inkjet ink composition.

The pH of the aqueous colorless inkjet ink compositions can be at least 6 and up to and including 10, or more likely at least 6.5 and up to and including 9, or in some embodiments of at least 7 and up to and including 8.5, with or without suitable adjustment. The pH can be achieved using any suitable base such as an organic amine in a suitable amount. Buffers can be included to maintain the desired pH and such materials would be readily apparent to one skilled in the art, including those described in Cols. 17-19 of U.S. Pat. No. 8,455,570 (noted above).

Ink Sets

The aqueous colorless inkjet ink compositions described for use in this invention can be provided as part of an ink set. Such ink sets can therefore include one or more aqueous color inkjet ink compositions, each of which comprises at least one visible colorant (described below) to provide an optical density of at least 0.1. For example, each ink set can include for example, one or more aqueous color inkjet ink compositions chosen from an aqueous cyan inkjet ink composition, an aqueous magenta inkjet ink composition, an aqueous yellow inkjet ink composition, and an aqueous black inkjet ink composition. Other useful aqueous color inkjet ink compositions can have different hues or "colors" such as orange, red, violet, blue, and green, and thus contain one or more suitable aqueous soluble or aqueous-dispersible dyes or pigments. Aqueous "white" aqueous inkjet ink compositions also can be included in an ink set. Typically, each aqueous color inkjet ink composition in an ink set comprises one or more organic or inorganic pigment colorants or dyes to provide desired hue.

A particularly useful color inkjet ink composition that can be included in an ink set is a green inkjet ink composition for example, as described in copending and commonly assigned U.S. Ser. No. 15/092,642 (filed Apr. 7, 2016), the disclosure of which is incorporated herein by reference. Such green inkjet ink compositions comprise a unique combination of a green copper phthalocyanine pigment and a yellow azo-coupled β-ketoamide pigment, and the green and yellow pigments particle size is generally less than 150 nm.

Each of the aqueous color inkjet ink compositions also can be provided with the various materials that are known to be used for this purpose, including surfactants, humectants or co-solvents, colorant dispersants, polymers (including core-shell polymers as described in Col. 13, lines 26-39 of U.S. Pat. No. 8,455,570, noted above), anionic polyether polyurethanes, anionic acrylic polymers, anionic styrene-acrylic polymers, biocides, thickeners, non-colored particles, and other materials that are described above for the aqueous colorless inkjet ink compositions.

A wide variety of organic and inorganic pigments can be used individually or in combination for these aqueous color inkjet ink compositions. For example, a carbon black pigment can be combined with a colored pigment such as a cyan copper phthalocyanine or a magenta quinacridine pigment. Useful pigments are described for example in U.S. Pat. No. 5,026,427 (Mitchell et al.), U.S. Pat. No. 5,141,556 (Matrick), U.S. Pat. No. 5,160,370 (Suga et al.), and U.S. Pat. No. 5,169,436 (Matrick), the disclosures of all of which are incorporated herein by reference.

For example, useful pigment colorants include but are not limited to, azo pigments, monoazo pigments, disazo pigments, azo pigment lakes, β-naphthol pigments, naphthol AS pigments, benzimidazolone pigments, disazo condensation pigments, metal complex pigments, isoindolinone and isoindoline pigments, quinacridone pigments, polycyclic pigments, phthalocyanine pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium dioxide, iron oxide, and carbon blacks. Specific useful pigment colorants are described in Col. 10 (lines 66) to Col. 11 (line 40) of U.S. Pat. No. 8,455,570 (noted above).

The useful pigment colorants can be accompanied by suitable polymeric or non-polymeric dispersants that are well known in the art, or the pigment colorants can be self-dispersing and thus dispersible and stable in the aqueous color inkjet ink compositions without the use of dispersants because of the presence of appropriate surface groups. Examples of useful self-dispersing pigment colorants are described in Col. 11 (lines 49-53) of U.S. Pat. No. 8,455,570 (noted above).

Useful pigment colorants can have a median particle diameter of less than 150 nm and more likely less than 100 nm or even less than 50 nm. As useful herein, the term "median particle diameter" refers to the $50^{th}$ percentile of the classified particle size distribution such that 50% of the volume of the particles is provided by particles having diameters smaller than the indicated diameter. A conventional laser light scattering device can be used to measure the particle size distributions.

Organic pigment colorants can be present in each aqueous color inkjet ink compositions in an amount of at least 0.1 weight % and up to and including 30 weight %, or more likely of at least 1 weight % and up to and including 10 weight %, or even of at least 1 weight % and up to and including 8 weight %, based on the total weight of the aqueous color inkjet ink composition.

Additionally, or alternatively to the pigment colorants, the aqueous color inkjet ink compositions can include one or more aqueous-soluble dyes that are well known in the art, for example as described in Col. 12 (lines 4-55) of U.S. Pat. No. 8,455,570 (noted above).

Each of the aqueous color inkjet ink compositions can have a pH of at least 8 and up to and including 10, or of at least 8 and up to and including 9.5, as described above for the aqueous colorless inkjet ink compositions, using suitable bases and buffer systems.

Such aqueous color inkjet ink compositions can provide suitable static surface tensions when applied to a suitable substrate, for example of at least 20 mN/m and up to and including 60 mN/m as measured using a suitable method as described herein for the aqueous colorless inkjet ink compositions (Wilhelmy plate method).

Each aqueous color inkjet ink composition can have suitable viscosity of at least 1 centipose (0.001 N-sec) but generally less than 5 centipoises (0.005 N-sec), or even equal to or less than 3 centipoises (0.003 N-sec), all measured at 25° C. using a suitable viscometer.

The aqueous colorless inkjet ink compositions and each aqueous color inkjet ink composition described herein can be prepared by dispersing suitable pigments (if present) in water, and mixing the pigments and other noted materials in suitable amounts. Examples of how formulations can be prepared are provided below for the working Examples.

Methods of Inkjet Printing

The present invention can be practiced by forming a colored image on a suitable substrate (described below) by a suitable inkjet printing apparatus. This colored image can be formed using any suitable application means to provide both colored areas (printed areas) and non-colored areas (areas without any color, or non-color printed areas) on the substrate. Suitable application means include but are not limited to, inkjet printing, flexographic printing, gravure printing, lithographic printing, screen printing, and any other means known in the art for providing a colored image with both colored areas and non-colored areas.

In most embodiments, the colored image is provided by inkjet printing one or more aqueous color inkjet ink compositions using thermal or piezoelectric drop-on-demand (DOD) printheads or continuous (CIJ) printheads. Each type of printhead and apparatus attached thereto require specific properties in the compositions in order to achieve reliable and accurate jetting of each composition (whether colorless or colored).

Thus, the method of this invention for inkjet printing can comprise:
providing a substrate having a predetermined area for imaging,
providing a colored image on the substrate, using for example, by inkjet printing, the colored image comprising colored areas and non-colored areas on the substrate,
ink jetting an aqueous colorless inkjet ink composition (as described herein) from a main fluid supply as a continuous stream that is broken into both printing (spaced) colorless drops and non-printing drops to provide a colorless image on at least a portion of the colored image on the substrate, and
optionally, collecting and returning the non-printing drops to the main fluid supply.

For example, the aqueous colorless inkjet ink composition can be ink jetted to provide a colorless image over at least 50% of the colored areas of the colored image and over (or overlying or superimposed upon) up to and including 100% of the non-colored areas of the colored image (for example, a predetermined areal percentage of the colored image. In most embodiments, less than 100% of the non-colored areas are covered using the aqueous colorless inkjet ink composition.

The aqueous colorless inkjet ink composition can be applied in a suitable ink jetting manner. The multiple compositions can be applied simultaneously or sequentially. By a "manner overlying," it is meant that the two or more inkjet ink compositions are applied to the substrate closely enough to be in reactive association thereby enabling electrostatic cross reaction between the distinctly charged particles in the two distinct inkjet ink compositions.

For example, in many embodiments, the aqueous colorless inkjet ink composition and one or more aqueous color inkjet ink compositions have dedicated delivery channels to avoid having oppositely charged materials in the multiple inkjet ink compositions interact until they come into reactive association on the intended substrate. The aqueous colorless inkjet ink composition can be applied (ink jetted) either in the same pass in-line with the one that provides the one or more aqueous color inkjet ink compositions, or in a separate pass.

The aqueous colorless inkjet ink composition can be applied to either to only non-colored areas, only colored areas, or both non-colored and colored areas of the given colored image.

When the method is carried out using CIJ apparatus and processes, it comprises:
ink jetting the aqueous colorless inkjet ink composition described herein from a main fluid supply as a continuous stream that is broken into both the printing (spaced) colorless drops and non-printing colorless drops; and
collecting and returning the non-printing colorless drops to the main fluid supply.

In some embodiments, ink jetting can be carried out using a drop generator mechanism so that the printing colorless drops cover at least 90% of the colored areas of the color image and less than 5% of the non-colored areas of the colored image on the substrate.

The method of this invention can include:
delivering an aqueous color inkjet ink composition to a first drop generator mechanism,
ejecting the aqueous color inkjet ink composition from the first drop generator mechanism as printing (spaced) color drops while controlling the printing color drops to provide the colored image on the substrate;
delivering an aqueous colorless inkjet ink composition to a second drop generator mechanism, and
ejecting the aqueous colorless inkjet ink composition from a different drop generator mechanism as the printing colorless drops while controlling the printing colorless drops.

The colored image can also be carried out as part of a CIJ method of this invention as comprising:
delivering the aqueous color inkjet ink composition from a first main fluid supply as a continuous stream that is broken into both printing color drops and non-printing color drops;
collecting and returning the non-printing color drops to the first main fluid supply;
delivering the aqueous colorless inkjet ink composition from a different main fluid supply as a continuous stream that is broken into both printing colorless drops and non-printing colorless drops; and
collecting and returning the non-printing colorless drops to the different main fluid supply.

Ink jetting, especially for some CIJ operations, can be carried out at a suitable drop generation frequency of at least 100 kHz or at least 350 kHz with a near nozzle velocity of at least 10 m/sec or at least 15 m/sec. More likely, the drop generation frequency is at least 350 kHz and up to and including 1000 kHz at a near nozzle velocity of at least 15 m/sec and up to and including 25 m/sec.

The aqueous colorless inkjet ink composition and any of the aqueous color inkjet ink compositions can be positioned in any one of the printhead ports intended for use in the present invention. The printhead containing the aqueous colorless inkjet ink composition can be positioned on the same carriage assembly as the one used for the aqueous color inkjet ink compositions, or it can be positioned on a separate carriage assembly.

The method can be carried out to provide a suitable inkjet ink image (both colored and colorless images) on a suitable substrate (also known in the art as "receiver" or "receiver element"). Any individual substrate will have what would be understood as a total "printable" area onto which a composition can be ink jetted using suitable equipment and processes. The present invention can be used to apply an aqueous color inkjet ink composition and an aqueous colorless inkjet ink composition over a predetermined or areal percentage of the total printable area including both colored areas and non-colored areas. Thus, the predetermined or areal percentage of the substrate to be covered by any individual inkjet ink composition according to this invention can be as low as 0.5% and up to and including 100%, but more likely at least 10% and up to and including 100%.

Suitable substrates can include but are not limited to, photoglossy receivers or plain paper receivers such as bright white inkjet papers that are available from a number of commercial sources (as described for example, in Col. 13, lines 28-34 of U.S. Pat. No. 8,187,371, noted above). The photoglossy receivers (also known as swellable media or microporous media) can be manufactured with a coated layer on an underlying paper support and are also useful for providing photographic quality inkjet printed images. Some details of such substrates are provided in Col. 13 (lines 37-51) of U.S. Pat. No. 8,187,371 (noted above). Plain papers can be treated with multivalent salts during or after manufacture as is well known in the art. Other useful substrates are described in U.S. Pat. No. 6,045,917 (Missell et al.), U.S. Pat. No. 5,605,750 (Romano et al.), U.S. Pat. No. 5,723,211 (Romano et al.), and U.S. Pat. No. 5,789,070 (Shaw-Klein et al.).

Useful paper substrates include plain bond papers, surface-treated papers, coated or calendared business gloss papers, resin-coated papers, laminated substrates comprising both paper layers and polymeric film layers such as polyester film layers, and heavy stock papers. It is also possible to use fabrics, cardboard, plastic films (such as polyester films), microporous materials, and any other substrate material known in the art. The substrate can be transparent, translucent, or opaque. The substrate can be in the form of a rigid or semi-rigid sheet or formed as a flexible material into a wound roll.

The durability and other properties of printed colorless and color images provided according to this invention can be improved by using substrates that have been pretreated with a composition to enhance the quality of the inkjet printed colorless and color images. This pretreatment is typically done prior to incorporation of the substrate into the inkjet printing apparatus (such as a continuous inkjet printing apparatus), but in some instances, the substrate can be pretreated within the apparatus before application of the aqueous colorless inkjet ink composition. One or both planar sides of a substrate can be pretreated, or one side can be pretreated and the opposite surface left untreated.

For example, a substrate can be pretreated with a pretreatment composition comprising a water-soluble multivalent metal ion salt, such as but not limited to, a salt comprising one or more multivalent cations including calcium, magnesium, barium, zinc, and aluminum cations, with calcium and magnesium cations being particularly useful. Examples of useful multivalent metal cation salts include but are not limited to, calcium chloride, calcium acetate, calcium nitrate, magnesium chloride, magnesium acetate, magnesium nitrate, barium chloride, barium nitrate, zinc chloride, zinc nitrate, aluminum chloride, aluminum hydroxychloride, and aluminum nitrate. Other useful salts could be determined by a skilled artisan, and one or more of such multivalent metal cation salts can be used in the pretreatment composition in an amount that would be readily apparent to one skilled in the art.

Such pretreatment compositions can also comprise a cationic polyelectrolyte comprising amidine moieties, and the details of such compounds and their useful amounts are provided in U.S. Pat. No. 8,562,126 (Xiang et al.), the disclosure of which is incorporated herein by reference.

Besides using an inkjet printer apparatus (such as a continuous inkjet printer apparatus), the various compositions described herein can also be applied using other mechanical techniques including but not limited to, rod coating, blade coating, gravure coating, flexographic printing, extrusion hopper coating, curtain coating, and spray coating.

A resulting printed substrate (or printed receiver element) can be any suitable article including but not limited to, documents, paper currency, postage stamps, various packaging materials, fabrics, polymeric films or sheets, labels for clothing, perfume and wine bottles labels, lottery tickets, passports, driver's licenses, and other articles that would be readily apparent to one skilled in the art using the teaching provided herein.

It is highly desirable in the practice of the present invention that the aqueous colorless inkjet ink composition be applied over at least 50% of a colored image as spaced colorless drops to provide an increase in glossiness on the colored areas, non-colored areas, or both colored areas and non-colored areas, of the colored image of at least 3 gloss units, or at least 5 gloss units, and up to and including 40 gloss units, as measured by a 75° glossmeter, compared to such colored areas or non-colored areas without, or before application of, the aqueous colorless inkjet ink composition. Such glossmeters can be obtained from several commercial sources. One such instrument useful for measuring glossiness for the present invention is a BYK-Gardner 75° glossmeter. Similar gloss improvements can be determined at 20°, 60°, and 85° using appropriate instrumentation. The angle of gloss measurement may be varied depending upon the type of substrate used in the present invention. In general, higher gloss can be achieved using higher coverages of the aqueous colorless inkjet ink compositions, but glossiness can also be adjusted by using different combinations of the essential anionic polyether polyurethanes and anionic acrylic polymers or anionic styrene-anionic polymers described above. Routine experimentation would enable a skilled artisan to achieve a desired increase in glossiness for a given use.

It is also useful that the printing colorless drops of the aqueous colorless inkjet ink compositions be dried on the substrate in a suitable manner after they have been ink jetted.

One sub-system common to most CIJ apparatus and methods and to some of the more recent DOD printing systems, is a recirculating fluid system that constantly recirculates an inkjet ink composition, whether it be the aqueous colorless inkjet ink composition or an aqueous color inkjet ink composition. For the aqueous color inkjet ink compositions used in the method of this invention, the median particle size of the color pigments and the overall stability of the color pigment particle dispersion, are important features due to the potentially abrasive nature of color pigment particle dispersions. Larger particles or less stable particle dispersions are more prone to cause premature wear or failure of the components of the inkjet printing system and fluid sub-system.

In some embodiments of the present invention, the aqueous colorless inkjet printer ink composition is printed by employing a plurality of drop volumes (or drop size) formed from the continuous fluid stream, with non-printing drops of a different volume than printing drops being diverted by a drop deflection means into a gutter for recirculation, as disclosed for example in U.S. Pat. No. 6,588,888 (noted above), U.S. Pat. No. 6,554,410 (Jeanmaire et al.), U.S. Pat. No. 6,682,182 (Jeanmaire et al.), U.S. Pat. No. 6,793,328 (Jeanmaire), U.S. Pat. No. 6,517,197 (Hawkins et al.), U.S. Pat. No. 6,866,370 (Jeanmaire), and U.S. Pat. No. 6,575,566 (Jeanmaire et al.), U.S. Patent Application Publication 2003/0202054 (Jeanmaire et al.) the disclosures of all of which are incorporated herein by reference.

In other embodiments, the aqueous colorless inkjet ink composition is printed onto at least part of the colored image (defined above) on a suitable substrate using an apparatus capable of controlling the direction of the printing and non-printing drops by asymmetric application of heat to the continuous stream of the aqueous colorless inkjet ink composition that initializes drop break-up and serves to steer the resultant drops, as disclosed for example in U.S. Pat. No. 6,079,821 (Chwalek et al.) and U.S. Pat. No. 6,505,921 (Chwalek et al.), the disclosures of both of which are herein incorporated by reference. Useful agitation of the aqueous colorless inkjet ink composition, heated main fluid supply, and inkjet print head and composition filtration means for CIJ ink compositions are described for example in U.S. Pat. No. 6,817,705 (Crockett et al.), the disclosure of which is incorporated herein by reference. Printer replenishing systems for maintaining quality of the aqueous colorless inkjet ink composition and to counter the effects of volatile component evaporation are described in U.S. Pat. No. 5,526,026 (Bowers) and U.S. Pat. No. 5,473,350 (Mader et al.), the disclosures of which are incorporated herein by reference, and in EP 0 597 628 A1 (Loyd et al.).

It can be useful to regularly replenish the main fluid supply with additional aqueous colorless inkjet ink composition described herein to keep the reservoir at a desired level during inkjet printing. Alternatively, water can be added to the main fluid supply to compensate for evaporation during inkjet printing. A skilled worker in the art would understand how to accomplish these operations using the teaching provided in the art noted above.

The present invention provides at least the following embodiments and combinations thereof, but other combinations of features are considered to be within the present invention as a skilled artisan would appreciate from the teaching of this disclosure:

1. A method of inkjet printing, comprising:
    providing a substrate having a predetermined area for imaging,
    providing a colored image on the substrate, the colored image comprising colored areas and non-colored areas on the substrate, and
    ink jetting an aqueous colorless inkjet ink composition as printing colorless drops to provide a colorless image over at least 50% of the colored areas of the colored image and over a predetermined areal percentage of the non-colored areas of the colored image,
    wherein the aqueous colorless inkjet ink composition is visible colorant-free and non-UV curable, has a viscosity of less than 5 centipoises (0.005 N-sec) at 25° C., and comprises an anionic polyether polyurethane having an acid number of at least 50 and an anionic acrylic polymer or anionic styrene-acrylic polymer having an acid number of at least 50; the weight ratio of the anionic polyether polyurethane to the anionic acrylic polymer or anionic styrene-acrylic polymer is from 1:9 to and including 9:1; and the total amount of the anionic polyether polyurethane and the anionic acrylic polymer or anionic styrene-acrylic polymer is less than or equal to 20 weight % based on the total aqueous colorless inkjet ink composition weight.

2. The method of embodiment 1, comprising:
    ink jetting the aqueous colorless inkjet ink composition from a main fluid supply as a continuous stream that is broken into both printing colorless drops and non-printing colorless drops; and
    collecting and returning the non-printing colorless drops to the main fluid supply.

3. The method of embodiment 1 or 2, wherein the aqueous colorless inkjet ink composition is provided as printing colorless drops and non-printing colorless drops using a continuous inkjet printing apparatus, and the method further comprising:
    collecting and returning the non-printing colorless drops to the main fluid supply.

4. The method of any of embodiments 1 to 3, comprising:
    ink jetting the aqueous colorless inkjet ink composition from a drop generator mechanism so that the printing colorless drops provide a colorless image over at least 90% of the colored areas of the colored image and over less than 5% of the non-colored areas of the colored image on the substrate.

5. The method of any of embodiments 1 to 4, comprising:
    delivering an aqueous color inkjet ink composition to a first drop generator mechanism,
    ejecting the aqueous color inkjet ink composition from the first drop generator mechanism as printing color drops while controlling the printing color drops to provide the colored image on the substrate;
    delivering the aqueous colorless inkjet ink composition to a second drop generator mechanism, and
    ejecting the aqueous colorless inkjet ink composition from the second drop generator mechanism as printing colorless drops while controlling the printing colorless drops.

6. The method of embodiment 5, comprising:
    delivering the aqueous color inkjet ink composition from a first main fluid supply as a continuous stream that is broken into both printing color drops and non-printing color drops;
    collecting and returning the non-printing color drops to the first main fluid supply;
    delivering the aqueous colorless inkjet ink composition from a different main fluid supply as a continuous stream that is broken into both printing colorless drops and non-printing colorless drops; and collecting and returning the non-printing colorless drops to the different main fluid supply.

7. The method of any of embodiments 1 to 6, comprising ink jetting the aqueous colorless inkjet ink composition at a drop generation frequency of at least 100 kHz with a near nozzle velocity of at least 10 m/sec.

8. The method of any of embodiments 1 to 7, comprising:
ink jetting the aqueous colorless inkjet ink composition as printing colorless drops to provide a colorless image to cover at least 90% of the colored areas and at least 5% but less than 100% of the non-colored areas of the colored image on the substrate.

9. The method of any of embodiments 1 to 8, comprising:
ink jetting the aqueous colorless inkjet ink composition as printing colorless drops to increase glossiness of the colored areas of the colored image by at least 3 gloss units compared to the glossiness of the colored areas of the colored image without the aqueous colorless inkjet ink composition, as measured by a 75° glossmeter.

10. The method of any of embodiments 1 to 9, comprising:
ink jetting the aqueous colorless inkjet ink composition as printing colorless drops to increase glossiness of the non-colored areas of the colored image by at least 3 gloss units compared to the glossiness of the non-colored areas of the colored image without the aqueous colorless inkjet ink composition, as measured by a 75° glossmeter.

11. An ink set comprising at least the following individual inks:
1) an aqueous colorless inkjet ink composition that is visible colorant-free and non-UV curable, has a viscosity of less than 5 centipoises (0.005 N-sec) at 25° C., and comprises an anionic polyether polyurethane having an acid number of at least 50 and an anionic acrylic polymer or styrene-acrylic polymer having an acid number of at least 50;
wherein the weight ratio of the anionic polyether polyurethane to the anionic acrylic polymer or anionic styrene-acrylic polymer is from 1:9 to and including 9:1; and the total amount of the anionic polyether polyurethane and the anionic acrylic polymer or anionic styrene-acrylic polymer is less than or equal to 20 weight % based on the total aqueous colorless inkjet ink composition weight; and
2) an aqueous color inkjet ink composition that comprises at least one visible colorant.

12. The ink set of embodiment 11, wherein the aqueous color inkjet ink composition is one of following compositions:
an aqueous cyan inkjet ink composition,
an aqueous magenta inkjet ink composition,
an aqueous yellow inkjet ink composition, or
an aqueous black inkjet ink composition.

13. Any of embodiments 1 to 12, wherein the aqueous colorless inkjet ink composition comprises a mixture of at least one anionic acrylic polymer or anionic styrene-acrylic polymer having a molecular weight of at least 2,000 Daltons and up to and including 10,000 Daltons, and at least one other anionic acrylic polymer or anionic styrene-acrylic polymer having a molecular weight greater than 10,000 Daltons.

14. Any of embodiments 1 to 13, wherein the aqueous colorless inkjet ink composition has a viscosity of less than or equal to 2 centipoises (0.002 N-sec) at 25° C.

15. Any of embodiments 1 to 14, wherein the aqueous colorless inkjet ink composition has a static surface tension of less than 38 dynes/cm when measured by the Wilhelmy Plate method.

16. Any of embodiments 1 to 15, wherein the aqueous colorless inkjet ink composition has a static surface tension that is less than the surface tension of the colored areas.

17. Any of embodiments 1 to 16, wherein the aqueous colorless inkjet ink has a weight ratio of the anionic polyether polyurethane to the anionic acrylic polymer or anionic styrene-acrylic polymer of from 1:3 to and including 3:1.

18. Any of embodiments 1 to 17, wherein the aqueous colorless inkjet ink composition comprises a total amount of the anionic polyether polyurethane and the anionic acrylic polymer or anionic styrene-acrylic polymer of at least 5 weight % and up to and including 18 weight %, based on the total aqueous colorless inkjet ink composition weight.

19. Any of embodiments 1 to 18, wherein the aqueous colorless inkjet ink composition further comprises at least 0.25 weight % and up to and including 10 weight % of a humectant, based on the total aqueous colorless inkjet ink composition weight.

20. Any of embodiments 1 to 19, wherein the anionic acrylic polymer or anionic styrene-acrylic polymer has a weight average molecular weight of at least 1,000 and up to and including 50,000, and the anionic acrylic polymer or anionic styrene-acrylic polymer comprises carboxy groups.

21. Any of embodiments 1 to 20, wherein the polyether polyurethane has an acid number of at least 60 and up to and including 150, and the anionic acrylic polymer or anionic styrene-acrylic polymer has an acid number of at least 120 and up to and including 240.

22. Any of embodiments 1 to 21, wherein the aqueous colorless inkjet ink composition further comprises a modified polysiloxane in an amount of up to and including 1 weight %, based on the total aqueous colorless inkjet ink composition weight.

23. Any of embodiments 1 to 22, wherein the aqueous colorless inkjet ink composition further comprises at least 0.1 weight % and up to and including 2 weight % of colloidal inorganic metal oxide particles that absorb near-IR radiation of at least 700 nm and up to and including 1000 nm.

24. Any of embodiments 1 to 23, wherein the aqueous colorless inkjet ink composition comprises less than 0.20 weight % of a wax.

25. Any of embodiments 1 to 24, wherein the aqueous colorless inkjet ink composition comprises less than 0.15 weight % of a wax.

26. Any of embodiments 1 to 25, wherein the aqueous colorless inkjet ink composition comprises water in an amount of at least 85 weight %, based on the total aqueous colorless inkjet ink composition weight.

The following Examples are provided to illustrate the practice of this invention and are not meant to be limiting in any manner.

The following aqueous colorless inkjet ink compositions were prepared and used in various ink jetting methods.

COMPARATIVE EXAMPLE 1

An aqueous colorless inkjet ink composition was prepared outside the present invention, and similar to those compositions described in WO 2014/021840 (noted above), containing wax particles, by adding the following components into a 100 ml high density polyethylene bottle while carrying out magnetic stirring: 1.44 grams of JONCRYL® Wax 26 (26 weight % solution), 23.9 grams of the polyether polyurethane (PEPU-1-DMEA, 25.1 weight %) prepared as described in U.S. Pat. No. 8,430,492 (Falkner et al.), 1.5 grams of triethylene glycol as a humectant, 0.15 gram of Dow Chemical DC 67 modified polysiloxane surfactant, 0.15 gram of SURFYNOL® DF110L defoamer, 0.13 gram of a 9.5 weight % solution of the biocide Kordek MLX, 0.08 gram of anticorrosive agent COBRATEC® TT 50S (sodium tolyltriazole, 50% solution), and 47.64 grams of high purity water. The resulting solution (75 g) was stirred for 1 hour and filtered using a 0.45 µm filter to provide a comparative aqueous colorless inkjet ink composition.

COMPARATIVE EXAMPLE 2

Another aqueous colorless inkjet ink composition outside of the present invention was prepared similarly to that described in Comparative Example 1 but no wax particles were included, by adding the following components into a 100 ml high density polyethylene bottle while carrying out magnetic stirring: 23.9 grams of the polyether polyurethane (PEPU-1-DMEA, 25.1 weight %), 1.5 grams of triethylene glycol as a humectant, 0.15 gram of Dow Chemical DC67 modified polysiloxane surfactant, 0.15 gram of SURFYNOL® DF110L defoamer, 0.13 gram of a 9.5 weight % solution of the biocide Kordek MLX, 0.08 gram of anticorrosive agent COBRATEC® TT 50S, and 49.1 grams of high purity water. The resulting solution (75 g) was stirred for 1 hour and filtered using a 0.45 µm filter to provide a comparative aqueous colorless inkjet ink composition.

COMPARATIVE EXAMPLE 3

Still another aqueous colorless inkjet ink composition was prepared outside the present invention, similarly to those described in WO 2014/021840 (noted above) containing wax particles as well as an anionic styrene-acrylic polymer, but adding the following components into a 100 ml high density polyethylene bottle while carrying out magnetic stirring: 6.62 grams of JONCRYL® 60 anionic styrene-acrylic polymer (34 weight % solution), 0.72 grams of JONCRYL® Wax 26 (26 weight % solution), 12.67 grams of the polyether polyurethane (PEPU-1-DMEA, 29.4 weight %), 3.75 grams of triethylene glycol as a humectant, 0.15 gram of Dow Chemical DC67 modified polysiloxane surfactant, 0.15 gram of SURFYNOL® DF110L defoamer, 0.13 gram of a 9.5 weight % solution of the biocide Kordek MLX, 0.08 grams of anticorrosive agent COBRATEC® TT 50S, and 50.7 grams of high purity water. The resulting solution (75 g) was stirred for 1 hour and filtered using a 0.45 µm filter to provide a comparative aqueous colorless inkjet ink composition.

INVENTIVE EXAMPLE 1

An aqueous colorless inkjet ink composition was prepared according to the present invention by adding the following components into a 100 ml high density polyethylene bottle while carrying out magnetic stirring: 4.24 grams of JONCRYL® 60 anionic styrene-acrylic polymer (34 weight % solution), 18.75 grams of JONCRYL® HPD 696-DMEA anionic styrene-acrylic polymer (20 weight % solution), 9.57 grams of the polyether polyurethane (PEPU-1-DMEA, 29.4 weight % solution) prepared as described in U.S. Pat. No. 8,430,492 (noted above), 1.88 grams of triethylene glycol as a humectant, 0.14 gram of Dow Chemical 28 modified polysiloxane surfactant, 0.04 gram of Dow Chemical DC67 modified polysiloxane surfactant, 0.15 gram of SURFYNOL® DF110L defoamer, 0.13 gram of a 9.5 weight % solution of the biocide Kordek MLX, 0.08 gram of anticorrosive agent COBRATEC® TT 50S, and 40.03 grams of high purity water. The resulting aqueous colorless inkjet ink composition (75 g) according to the present invention was stirred for 1 hour and filtered using a 0.45 µm filter.

INVENTIVE EXAMPLE 2

Another aqueous colorless inkjet ink composition was prepared according to the present invention by adding the following components into a 100 ml high density polyethylene bottle, with magnetic stirring: 6.62 grams of JONCRYL® 60 (34% aqueous solution) anionic styrene acrylic polymer, 12.67 grams of the polyether polyurethane (PEPU-1-DMEA, 29.4% aq. solution), 3.75 grams of the humectant triethylene glycol (TEG), 0.15 gram of surfactant Dow Corning DC67, 0.15 gram of defoamer SURFYNOL® DF110L, 0.13 gram of a 9.5 weight % solution of the biocide Kordek MLX, 0.08 gram of anticorrosive agent COBRATEC® TT 50S, and 51.45 grams of high purity water. The resulting aqueous colorless inkjet ink composition (75 g) according to the present invention was stirred for 1 hour and filtered using a 0.45 um disk filter.

INVENTIVE EXAMPLE 3

An aqueous colorless inkjet ink composition was prepared according to the present invention by adding the following components into a 100 ml high density polyethylene bottle while carrying out magnetic stirring: 13.24 grams of JONCRYL® 60 anionic styrene-acrylic polymer (34 weight % solution), 9.67 grams of the polyether polyurethane (PEPU-1-DMEA, 29.4 weight %), 2.25 grams of triethylene glycol as a humectant, 0.11 gram of Dow Chemical DC28 modified polysiloxane surfactant, 0.04 gram of Dow Chemical DC67, 0.15 gram of SURFYNOL® DF110L defoamer, 0.13 gram of a 9.5 weight % solution of the biocide Kordek MLX, 0.08 gram of anticorrosive agent COBRATEC® TT 50S, and 49.4 grams of high purity water. The resulting aqueous colorless inkjet ink composition (75 g) according to the present invention was stirred for 1 hour and filtered using a 0.45 µm polypropylene filter.

INVENTIVE EXAMPLE 4

Still another aqueous colorless inkjet ink composition was prepared according to the present invention by adding the following components into a 100 ml high density polyethylene bottle while carrying out magnetic stirring: 3.86 grams of JONCRYL® 60 anionic styrene-acrylic polymer (34 weight % solution), 22.5 grams of JONCRYL® HPD 696-DMEA anionic styrene-acrylic polymer (20 weight % solution), 3.72 grams of the polyether polyurethane (PEPU-1-DMEA, 25.2 weight %) prepared as described in U.S. Pat. No. 8,430,492 (noted above), 1.13 grams of triethylene glycol as a humectant, 0.4 gram of SURFYNOL® SE-F, 0.13 gram of a 9.5 weight % solution of the biocide Kordek MLX, 0.08 gram of anticorrosive agent COBRATEC® TT 50S, and 43.2 gram of high purity water. The resulting aqueous colorless inkjet ink composition (75 g) according to the present invention was stirred for 1 hour and filtered using a 0.45 µm filter.

Recirculation/Filtration Test:

For this test, 200 ml of the test aqueous inkjet ink composition were recirculated for 20 hours at room temperature (20-25° C.) through a 47 mm, 1.2 μm VERSAPOR® filter using a gear pump manufactured by Micropump (GJ-23-DB.380A). The pressure across the filter was constantly monitored and recorded throughout the recirculation period. After 20 hours, each test was stopped and a slope was calculated for the increase in pressure across the filter. However, if a pressure of 60 psi was reached, the test was immediately stopped before the 20 hours were completed.

Figure 1:
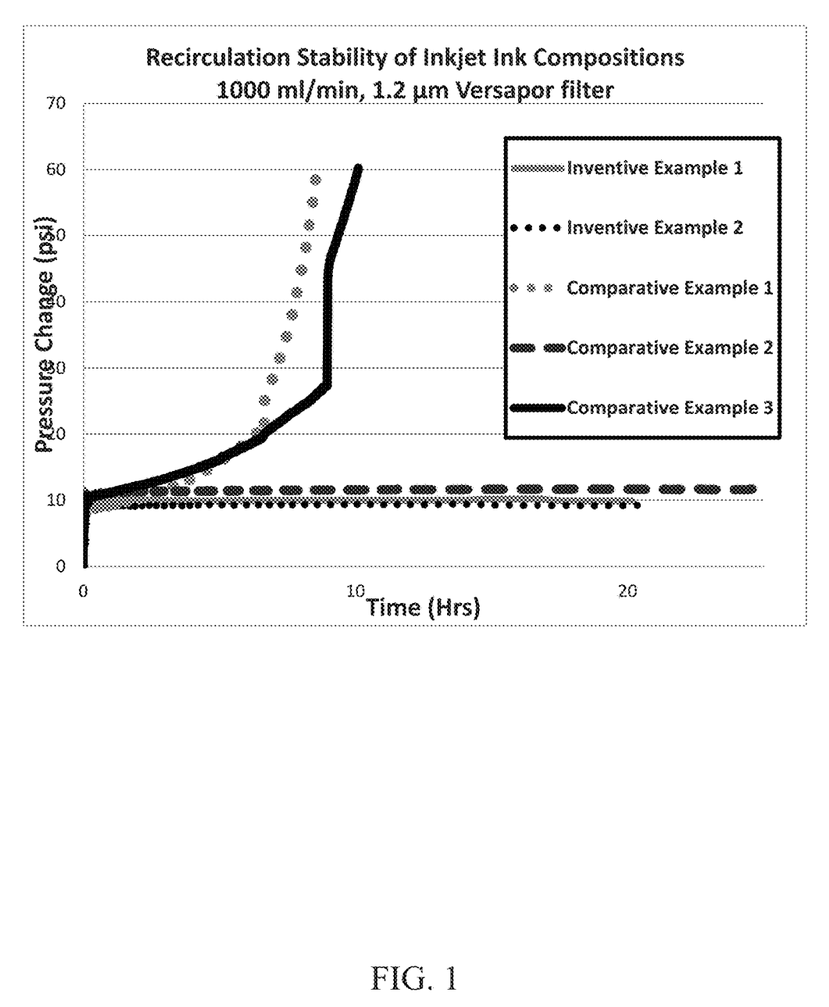
FIG. 1 is a graphical representation of time vs. pressure change for the Recirculation Stability tests described below in the working Examples.

The results of these tests for the various aqueous colorless inkjet in compositions are shown in FIG. 1. As can be seen from these data, the aqueous colorless inkjet ink composition of Comparative Example 1, containing a polyether polyurethane polymer and a small quantity of JONCRYL® wax 26 particles, plugged the VERSAPOR® filter, causing an unacceptable rise in pressure within less than 8 hours after the recirculation test was begun. Such an aqueous colorless inkjet ink composition is not useful in a continuous inkjet printing apparatus and method that typically requires multiple passes through filters during composition recirculation.

The Comparative Example 2 aqueous colorless inkjet ink composition was similar to Comparative Example 1 in composition but the wax particles had been omitted. As can be seen in FIG. 1, the absence of the wax particles allowed the composition to be recirculated without a pressure increase across the filter. However, the lack of an anionic acrylic styrene polymer resulted in poor gloss and dry rub durability, especially in continuous inkjet printing operations.

The aqueous colorless inkjet ink composition of Comparative Example 3 contained a polyether polyurethane, a low molecular weight anionic styrene acrylic polymer, and a small amount of wax particles. This composition had properties similar to that of Comparative Example 1 and caused plugging of the filter within 10 hours after the recirculation test had begun.

The aqueous colorless inkjet ink composition of Invention Example 2 was like that of Comparative Example 3, but the wax particles had been omitted. As the results in FIG. 1 show, the absence of the wax particles enabled the composition to be recirculated without a pressure increase across the filter during the 20-hour test, thus demonstrating that the present invention solves the problem caused by the presence of wax particles in inkjet printing systems comprising continuous recirculation/filtration operations.

Gloss Evaluation:

The gloss of inkjet printed aqueous colorless inkjet ink compositions described above was evaluated using a commercial BYK-Gardner 75° glossmeter and the instructions that were supplied for its use. A glossy substrate (or receiver element) used in the tests was a multivalent metal salt treated-STERLING® Ultra Gloss paper ("glossy" paper) and a non-glossy substrate used in the tests was a white corrugated board (Kemiart Graph; a double-coated white-top kraftliner material that is suitable for various imaging operations including inkjet printing). Each tested aqueous colorless inkjet ink composition was deposited by either continuous inkjet printing using a Kodak Prosper printhead or using a patch coating device onto substrate samples having preprinted magenta ("over magenta") and black ("over black") patches (or colored areas of the colored image), as well as over the non-colored areas ("over unprinted") of each substrate sample. Inkjet printing was carried out at either 600×600 dpi or 600×900 dpi.

Figure 2:
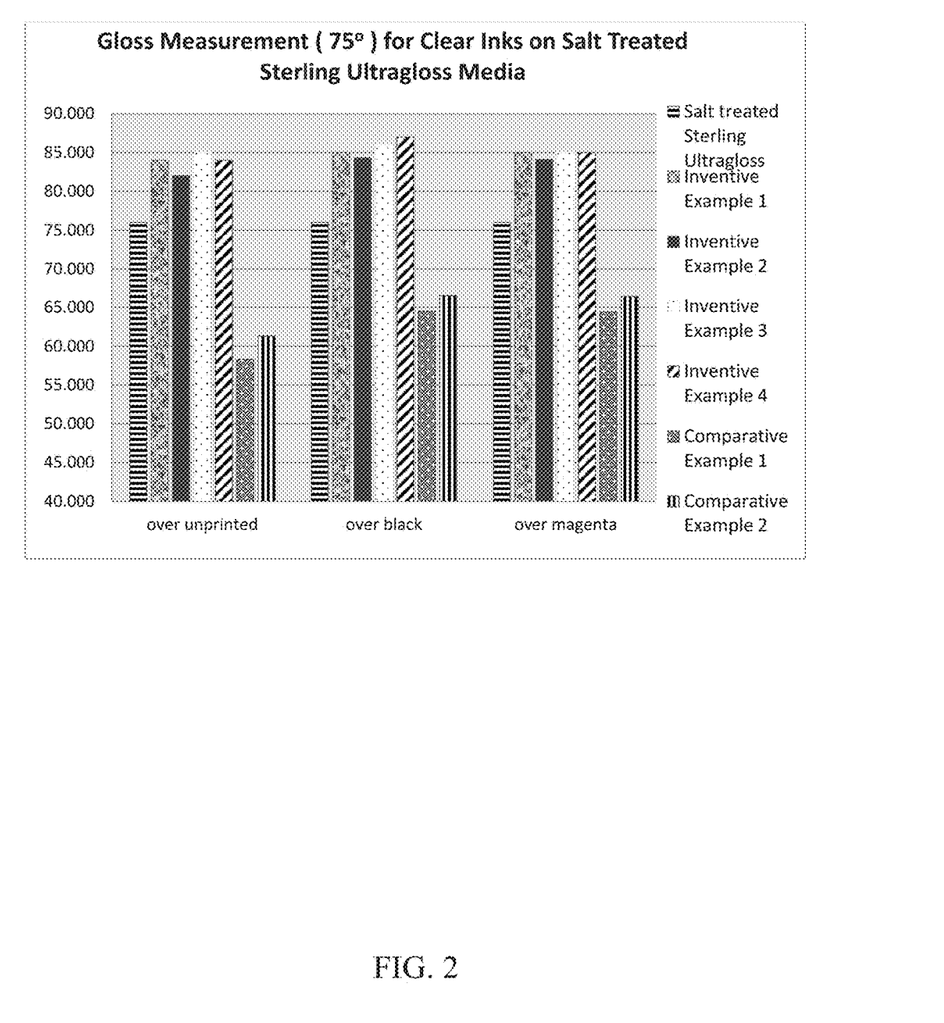
FIG. 2 is a bar graph representation of Gloss Measurements for colorless images on a glossy substrate as described below in the working Examples.
Figure 3:
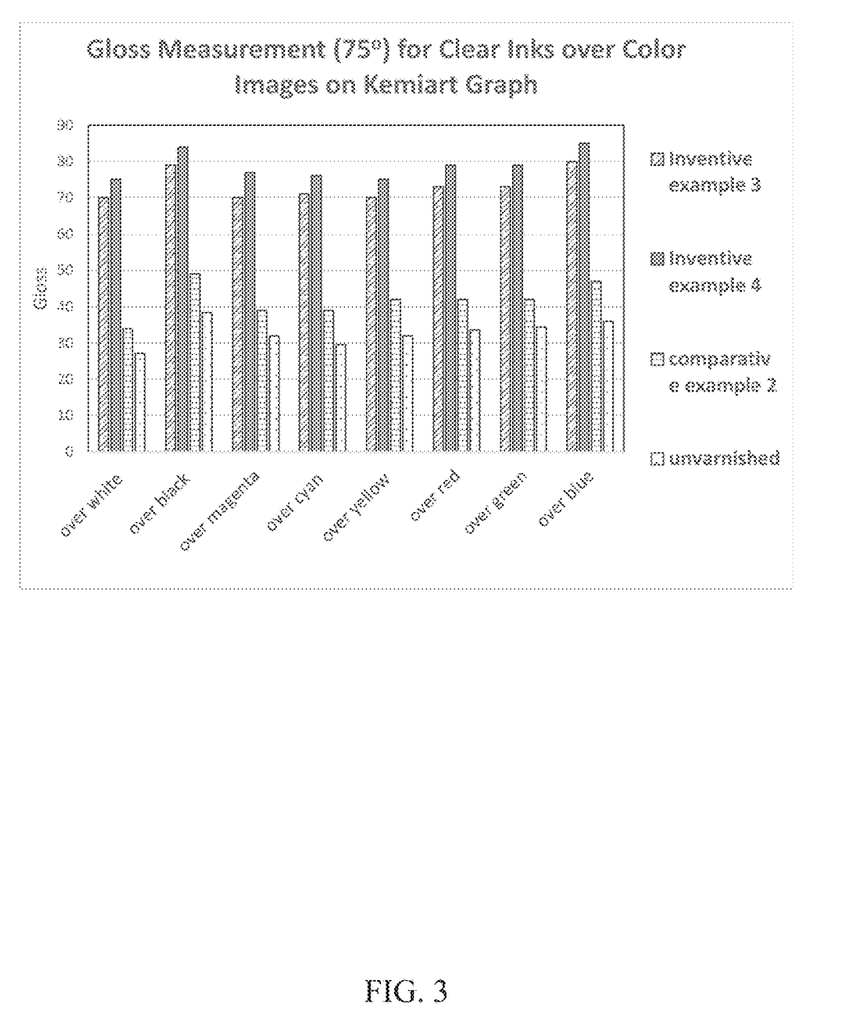
FIG. 3 is a bar graph representation of Gloss Measurements for colorless images on a non-glossy substrate as described below in the working Examples.

Gloss data (in gloss units) is presented in FIG. 2 for use of the glossy substrate and similar gloss data is presented in FIG. 3 for use of the non-glossy substrate.

As can be seen in FIG. 2, the colored areas and the non-colored areas over printed with the various Inventive aqueous colorless inkjet ink compositions exhibited significant gloss improvement (or a decrease in matting) compared to the Comparative aqueous colorless inkjet ink compositions.

In addition, it was observed that the aqueous colorless inkjet ink compositions of the Comparative Examples 1 and 2 exhibited an undesirable bronzing effect on the black images that was not observed using the aqueous colorless inkjet ink compositions according to the present invention.

Dry Rub Durability Testing:

Aqueous colorless inkjet ink compositions as described above were tested for "dry rub durability" using a Sutherland Ink Rub Tester having a 4 pound (8.8 kg) weight. Cyan, magenta, yellow, and black color patches were printed on pre-coated Kemiart Graph substrate, and then overcoated with the inventive aqueous colorless inkjet ink. Each of these samples was incubated for 20 hours at 40° C./50% RH for curing. Two separate rubbing media were utilized. The first rubbing medium was Laser MOCR and the second rubbing medium was one of the noted samples. Each sample was rubbed 150 times. For all samples, the overcoat from the aqueous colorless inkjet ink protected the color patches and no loss in color density was observed.

The invention has been described in detail with particular reference to certain preferred embodiments thereof, but it will be understood that variations and modifications can be effected within the spirit and scope of the invention.

The invention claimed is:

1. A method of inkjet printing, comprising:
providing a substrate having a predetermined area for imaging,
providing a colored image on the substrate, the colored image comprising colored areas and non-colored areas on the substrate, and
ink jetting an aqueous colorless inkjet ink composition as printing colorless drops to provide a colorless image over at least 50% of the colored areas of the colored image and over a predetermined areal percentage of the non-colored areas of the colored image,
wherein the aqueous colorless inkjet ink composition is visible colorant-free and non-UV curable, has a viscosity of less than 5 centipoises (0.005 N-sec) at 25° C., and comprises an anionic polyether polyurethane having an acid number of at least 50 and an anionic acrylic polymer or anionic styrene-acrylic polymer having an acid number of at least 50; the weight ratio of the anionic polyether polyurethane to the anionic acrylic polymer or anionic styrene-acrylic polymer is from 1:9 to and including 9:1; and the total amount of the anionic polyether polyurethane and the anionic acrylic polymer or anionic styrene-acrylic polymer is less than or equal to 20 weight % based on the total aqueous colorless inkjet ink composition weight,
wherein:
either the aqueous colorless inkjet ink composition is ink jetted as printing colorless drops to increase glossiness of the colored areas of the colored image by at least 3 gloss units compared to the glossiness of the colored areas of the colored image without the aqueous colorless inkjet ink composition, as measured by a 75° glossmeter, or the aqueous colorless inkjet ink composition is ink jetted as printing colorless drops to increase glossiness of the non-colored areas of the colored image by at least 3 gloss units compared to the glossiness of the non-colored areas of the colored image without the aqueous colorless inkjet ink composition, as measured by a 75° glossmeter, and the aqueous colorless inkjet ink composition comprises a mixture of at least one anionic acrylic polymer or anionic styrene-acrylic polymer having a molecular weight of at least 2,000 Daltons and up to and including 10,000 Daltons, and at least one other anionic acrylic polymer or anionic styrene-acrylic polymer having a molecular weight greater than 10,000 Daltons.

2. The method of claim 1, comprising:

ink jetting the aqueous colorless inkjet ink composition from a main fluid supply as a continuous stream that is broken into both printing colorless drops and non-printing colorless drops; and collecting and returning the non-printing colorless drops to the main fluid supply.

3. The method of claim 1, comprising:

ink jetting the aqueous colorless inkjet ink composition from a drop generator mechanism so that the printing colorless drops provide a colorless image over at least 90% of the colored areas of the colored image and over less than 5% of the non-colored areas of the colored image on the substrate.

4. The method of claim 1, comprising:

delivering an aqueous color inkjet ink composition to a first drop generator mechanism, ejecting the aqueous color inkjet ink composition from the first drop generator mechanism as printing color drops while controlling the printing color drops to provide the colored image on the substrate;

delivering the aqueous colorless inkjet ink composition to a second drop generator mechanism, and ejecting the aqueous colorless inkjet ink composition from the second drop generator mechanism as printing colorless drops while controlling the printing colorless drops.

5. The method of claim 1, wherein the aqueous colorless inkjet ink composition has a viscosity of less than or equal to 2 centipoises (0.002 N-sec) at 25° C.

6. The method of claim 1, comprising:

ink jetting the aqueous colorless inkjet ink composition as spaced colorless drops to provide a colorless image to cover at least 90% of the colored areas and at least 5% but less than 100% of the non-colored areas of the colored image on the substrate.

7. The method of claim 1, wherein the aqueous colorless inkjet ink composition has a static surface tension of less than 38 dynes/cm when measured by the Wilhelmy Plate method.

8. The method of claim 7, wherein the aqueous colorless inkjet ink composition has a static surface tension that is less than the surface tension of the colored areas.

9. The method of claim 1, wherein the aqueous colorless inkjet ink has a weight ratio of the anionic polyether polyurethane to the mixture of at least one anionic acrylic polymer or anionic styrene-acrylic polymer having a molecular weight of at least 2,000 Daltons and up to and including 10,000 Daltons, and at least one other anionic acrylic polymer or anionic styrene-acrylic polymer having a molecular weight greater than 10,000 Daltons, of from 1:3 to and including 3:1,and the aqueous colorless inkjet ink composition comprises a total amount of the anionic polyether polyurethane and the mixture of at least one anionic acrylic polymer or anionic styrene-acrylic polymer having a molecular weight of at least 2,000 Daltons and up to and including 10,000 Daltons, and at least one other anionic acrylic polymer or anionic styrene-acrylic polymer having a molecular weight greater than 10,000 Daltons at least 5 weight % and up to and including 18 weight %, based on the total aqueous colorless inkjet ink composition weight.

10. The method of claim 1, wherein at least one anionic acrylic polymer or anionic styrene-acrylic polymer comprises carboxy groups.

11. The method of claim 1, wherein the anionic polyether polyurethane has an acid number of at least 60 and up to and including 150, and the mixture of at least one anionic acrylic polymer or anionic styrene-acrylic polymer having a molecular weight of at least 2,000 Daltons and up to and including 10,000 Daltons, and at least one other anionic acrylic polymer or anionic styrene-acrylic polymer having a molecular weight greater than 10,000 Daltons has an acid number of at least 120 and up to and including 240.

12. The method of claim 1, wherein the aqueous colorless inkjet ink composition further comprises at least 0.1 weight % and up to and including 2 weight % of colloidal inorganic metal oxide particles that absorb near-IR radiation of at least 700 nm and up to and including 1000 nm.

13. The method of claim 1, wherein the aqueous colorless inkjet ink composition comprises less than 0.20 weight % of a wax.

14. The method of claim 1, wherein the aqueous colorless inkjet ink composition comprises water in an amount of at least 85 weight %, based on the total aqueous colorless inkjet ink composition weight.

15. An ink set comprising at least the following individual inks:

1) an aqueous colorless inkjet ink composition that is visible colorant-free and non-UV curable, has a viscosity of less than 5 centipoises (0.005 N-sec) at 25° C., and comprises an anionic polyether polyurethane having an acid number of at least 50, and a mixture of at least one anionic acrylic polymer or anionic styrene-acrylic polymer having a molecular weight of at least 2,000 Daltons and up to and including 10,000 Daltons and an acid number of at least 50, and at least one other anionic acrylic polymer or anionic styrene-acrylic polymer having a molecular weight greater than 10,000 Daltons and an acid number of at least 50;

wherein the weight ratio of the anionic polyether polyurethane to mixture of at least one anionic acrylic polymer or anionic styrene-acrylic polymer having a molecular weight of at least 2,000 Daltons and up to and including 10,000 Daltons and an acid number of at least 50, and at least one other anionic acrylic polymer or anionic styrene-acrylic polymer having a molecular weight greater than 10,000 Daltons is from 1:9 to and including 9:1; and the total amount of the anionic polyether polyurethane and the mixture of at least one anionic acrylic polymer or anionic styrene-acrylic polymer having a molecular weight of at least 2,000 Daltons and up to and including 10,000 Daltons and an acid number of at least 50, and at least one other anionic acrylic polymer or anionic styrene-acrylic polymer having a molecular weight greater than 10,000 Daltons is less than or equal to 20 weight % based on the total aqueous colorless inkjet ink composition weight; and 2) an aqueous color inkjet ink composition that comprises at least one visible colorant.

16. The ink set of claim 15, wherein the aqueous color inkjet ink composition is one of following compositions:
   an aqueous cyan inkjet ink composition,
   an aqueous magenta inkjet ink composition,
   an aqueous yellow inkjet ink composition, or
   an aqueous black inkjet ink composition.

\* \* \* \* \*